Patented July 9, 1940

2,207,416

UNITED STATES PATENT OFFICE

2,207,416

PIGMENT AND METHOD OF MANUFACTURE

Lonnie W. Ryan, Westfield, and Winfred Joseph Cauwenberg, Newark, N. J., assignors, by mesne assignments, to Interchemical Corporation, New York, N. Y., a corporation of Ohio No Drawing. Application April 21, 1937, Serial No. 138,104

8 Claims.  (Cl. 23—122)

This invention relates to new and useful improvements in the manufacture of composite pigments containing titanium dioxide and calcium sulphate, and has particular reference to a new and novel method for the preparation of calcium sulphate for use in such pigments, characterized by its extremely low cost and the high quality of the pigment calcium sulphate produced.

In our Patent No. 2,066,074, issued December 29, 1936, we described a method of making a composite pigment by hydrolytic precipitation of a titanium solution containing anhedral particles of gypsum of an average size substantially less than 5 microns in maximum dimension, and a method of preparing gypsum in this form by wet grinding in the presence of a substance which decreased the solubility of the gypsum in water and retarded its crystal growth. We have now invented an improved and more economical method of comminuting gypsum to place it substantially in the form of anhedral particles of an average size substantially less than 5 microns in maximum dimension, especially adapted as a base for composite titanium pigments. Besides being more economical, our new method has the advantage of producing gypsum in the condition specified in dry form, so that it is available generally as a pigment extender.

In accordance with our new method, gypsum is reduced to small anhedral particles of wholly or partially dehydrated calcium sulphate by driving off the greater part of the water of crystallization under conditions which shatter the crystal structure. We have discovered that when gypsum powder is slowly dehydrated, the loss of water from the gypsum results in a shattering of the large gypsum crystals either into a large number of small anhedral crystals or into loose agglomerates of small anhedral crystals. By "Anhedral" we mean substantially devoid of the crystal faces produced by normal crystal growth.

The particles are then rehydrated under conditions which substantially prevent recrystallization and crystal growth. We have discovered that such conditions may be obtained by avoiding the presence of any substantial amount of water in the liquid phase during the rehydration. This may be accomplished in accordance with our invention by rehydrating the particles, by slowly adding water either to the particles in a dispersed condition or to a mass of the particles while it is subjected to stirring or mixing.

We may, if desired, mix the rehydrated gypsum directly with the titanium solution to be hydrolyzed or we may subject it to a short dry milling or wet milling operation in order to break down the loose agglomerates prior to mixing with the titanium solution.

We may use natural gypsum, by-product gypsum, or artificially prepared gypsum prepared in any manner whatsoever. Preferably, the product should be as free as possible of undesired metals, if the pigment is to be used in making titanium pigments. Likewise, the starting product should be in powder form. We have found powder of an average particle size of 80 mesh to be excellently suited for our purposes.

The rehydration may be carried out in any convenient apparatus, as for example in a tower equipped with spray nozzles, in a horizontal or slightly inclined rotating drum equipped with spray nozzles, in a mixer of the type commonly known as a "dough mixer" or in a continuous screw conveyor. Rehydration of gypsum is an exothermic reaction and when using a mixer or screw conveyor we prefer to use a jacketed mixer or a jacketed conveyor trough cooled by running cold water during the rehydration.

In order that our invention may be more clearly understood, we now give in detail specific examples of the practice of it:

Example 1

700 pounds of gypsum ground to 80 mesh are charged into a kettle and, while slowly agitating, heated, during the course of about 10 hours, until the water of crystallization is completely expelled. At the end of this time the temperature of the dehydrated gypsum is about 150° C. and the weight has decreased to 553 pounds.

The 553 pounds of dehydrated gypsum are then put through a jacketed screw conveyor while 147 pounds of cold water are slowly added in such increments that no substantial liquid phase is ever present. The water is run through a pipe along the top of the conveyor and allowed to drop into the conveyor through small openings drilled in the under side of the pipe. During the addition of the water the material is cooled by circulating cold water through the jacket of the conveyor trough.

The 700 pounds of rehydrated gypsum are then charged into a pebble mill together with 168 gallons of water containing 2.45 pounds of hydrated lime—$Ca(OH)_2$—and 1.4 pounds of sodium sulphite and milled for about two hours whereby the agglomerated gypsum particles are dispersed. This milling breaks down the agglomerate structure.

The milled gypsum-water slurry is transferred to a tank and 117 gallons of water at 100° C. and containing one pound of 93% sulphuric acid is added. The temperature is brought to about 70° C. and 1930 pounds of an ilmenite ore solution, at a temperature of 65° C., and from which a part of the iron has been removed by crystallization as ferrous sulphate, and containing about 5 grams per liter of titanous sulphate calculated as TiO₂, and analyzing as follows, are added during about ½ minute:

| | Per cent |
|---|---|
| TiO₂ | 11.6 |
| Sulphuric acid free and combined with TiO₂ | 31.2 |

22.6 pounds of 93% sulphuric acid are then added and the mixture is rapidly heated to the boiling temperature and boiled until about 95% of the titanium is precipitated. The composite precipitate is filtered or separated from the mother liquor by other means, washed and calcined at a temperature of about 900° C.

*Example II*

700 pounds of gypsum are charged into a kettle and, while slowly agitating, heated during the course of about 8 hours until sufficient water of crystallization is expelled to leave the calcium sulphate in the form of hemi-hydrate

$$CaSO_4 \cdot \tfrac{1}{2} H_2O$$

At the end of this time the temperature of the hemi-hydrate is about 110° C., and the weight has decreased to 589 pounds, as determined by loss on ignition of a representative sample.

The 589 pounds of calcium sulphate in the form of hemi-hydrate are then charged into a rotating drum, and, while constantly rotating the drum, 111 pounds of cold water are slowly added during the course of about two hours. In this case, the water may be added in the form of a fine mist, obtained by spraying it into the drum through nozzles which break the water up into a spray.

The 700 pounds of rehydrated gypsum are then charged into a pebble mill together with 168 gallons of water containing 2.43 pounds of hydrated lime—Ca(OH)₂—and 1.4 pounds of sodium sulphite and milled for about two hours whereby the agglomerated gypsum particles are dispersed.

The milled gypsum-water slurry is now transferred to a tank and 117 gallons of water at 100° C. and containing about one pound of 93% sulphuric acid is added. The temperature is brought to about 70° C. and 1930 pounds of an ilmenite ore solution, at a temperature of 65° C., and from which a part of the iron has been removed by crystallization as ferrous sulphate, and containing about 5 grams per liter of titanous sulphate calculated as TiO₂, and analyzing as follows, are added during about ½ minute:

| | Per cent |
|---|---|
| TiO₂ | 11.6 |
| Sulphuric acid free and combined with TiO₂ | 31.2 |

22.6 pounds of 93% sulphuric acid are then added and the mixture is rapidly heated to the boiling temperature and boiled until about 95% of the titanium is precipitated. The composite precipitate is filtered or separated from the mother liquor by other means, washed and calcined at a temperature of about 900° C.

*Example III*

The method of Example II may be changed by using a jacketed dough mixer and low pressure steam, alone or mixed with atomized water, as the rehydrating agent.

*Example IV*

The method of Example II may be changed by using a tower, equipped with spray nozzles, into which cold water is atomized while the dehydrated gypsum dispersed in a stream of air, is passed through the tower.

We have found that by our method we can produce material of an average particle size of substantially less than 5 microns in maximum dimension, and, with ordinary care, of 1½ microns or less in diameter, by starting with a gypsum powder of rather large particle size, of the order of 100 to 200 microns. Most of the resultant crystals are similar in character to the anhedral crystals produced by the process of our U. S. Patent 2,068,074 of December 29, 1936; but our new process has the advantage of cost, and the added advantage that a pure calcium sulphate is obtained, in a dry state, which may be used as such as a pigment for paints, printing inks, and the like, or which may be carried on into the process of making composite pigments with excellent results.

We claim:

1. The method of preparing gypsum substantially in the form of anhedral particles having an average size of materially less than 5 microns in maximum dimension, which comprises shattering gypsum crystals into anhedral particles of said average size by expelling water of crystallization, and rehydrating the particles substantially completely while avoiding the presence of a substantial liquid water phase.

2. The method of comminuting gypsum, which comprises expelling water of crystallization from gypsum to shatter the gypsum crystals into small particles and rehydrating the particles substantially completely while avoiding the presence of a substantial body of water in the liquid phase.

3. The method of comminuting gypsum, which comprises slowly expelling water of crystallization from gypsum to shatter the gypsum crystals into small particles and rehydrating the particles substantially completely by adding water to the powder while mixing, in such increments as to avoid the presence of a substantial liquid phase.

4. The method of comminuting gypsum, which comprises slowly heating gypsum powder until a major portion of the water of crystallization has been expelled, and thereafter rehydrating substantially completely by adding water to the powder while mixing, in such increments as to avoid the presence of a substantial liquid phase.

5. The method of comminuting gypsum, which comprises slowly heating gypsum powder until a major portion of the water of crystallization has been expelled, and thereafter rehydrating substantially completely by adding water to the powder while mixing, in such increments as to avoid the presence of a substantial liquid phase, while cooling the powder to control the exothermic rehydration reaction.

6. The method of comminuting gypsum, which comprises slowly dehydrating gypsum powder to at least the hemi-hydrate, and thereafter rehydrating substantially completely by adding water to the powder while mixing, in such increments as to avoid the presence of a substantial liquid phase.

7. The method of comminuting gypsum, which comprises heating gypsum powder of an average particle size of the order of 100 to 200 microns until a major portion of the water of crystallization has been expelled, whereby the gypsum crystals are shattered into particles of an average size of the order of 1½ microns, and thereafter replacing substantially all of the expelled water while avoiding the presence of a substantial liquid phase.

8. The method of comminuting gypsum, which comprises heating gypsum powder of an average particle size of the order of 100 to 200 microns until a major portion of the water of crystallization has been expelled, whereby the gypsum crystals are shattered into particles of an average size of the order of 1½ microns or less, and thereafter replacing substantially all of the expelled water while avoiding the presence of a substantial liquid phase, and milling the resultant pigment for a short time to break up aggregates.

LONNIE W. RYAN.
WINFRED JOSEPH CAUWENBERG.